United States Patent
Kim et al.

(10) Patent No.: US 11,450,103 B2
(45) Date of Patent: Sep. 20, 2022

(54) VISION BASED LIGHT DETECTION AND RANGING SYSTEM USING DYNAMIC VISION SENSOR

(71) Applicant: Comotomo Corporation, Seoul (KR)

(72) Inventors: Sang-Pyo Kim, Los Altos, CA (US); Sreenivasa Kosireddy, Saratoga, CA (US)

(73) Assignee: CRAZING LAB, INC., Sunnyvale, CA (US)

( * ) Notice: Subject to any disclaimer, the term of this patent is extended or adjusted under 35 U.S.C. 154(b) by 0 days.

(21) Appl. No.: 17/063,404

(22) Filed: Oct. 5, 2020

(65) Prior Publication Data

US 2022/0108548 A1    Apr. 7, 2022

(51) Int. Cl.
| | |
|---|---|
| *G06V 20/40* | (2022.01) |
| *G01S 17/86* | (2020.01) |
| *G01S 17/66* | (2006.01) |
| *G06T 7/246* | (2017.01) |
| *G06K 9/62* | (2022.01) |
| *G06V 10/22* | (2022.01) |

(52) U.S. Cl.
CPC ............. *G06V 20/40* (2022.01); *G01S 17/66* (2013.01); *G01S 17/86* (2020.01); *G06K 9/6256* (2013.01); *G06T 7/246* (2017.01); *G06V 10/22* (2022.01); *G06T 2207/10028* (2013.01); *G06T 2207/20081* (2013.01); *G06V 20/44* (2022.01)

(58) Field of Classification Search
CPC ........ G06V 20/40; G06V 10/22; G06V 20/44; G06T 7/246; G06T 2207/10028; G06T 2207/20081; G01S 17/86; G01S 17/66; G06K 9/6256

USPC .......................................................... 382/103
See application file for complete search history.

(56) References Cited

U.S. PATENT DOCUMENTS

| | | | |
|---|---|---|---|
| 10,345,447 B1 * | 7/2019 | Hicks | ................... G01S 7/4863 |
| 2010/0046802 A1 | 2/2010 | Watanabe et al. | |
| 2015/0025843 A1 | 1/2015 | Takemura | |
| 2018/0146186 A1 | 5/2018 | Akkaya et al. | |
| 2018/0246188 A1 | 8/2018 | Pau et al. | |
| 2019/0018141 A1 | 1/2019 | Holz | |

(Continued)

FOREIGN PATENT DOCUMENTS

CN            102999918 A        3/2013

OTHER PUBLICATIONS

PCT International Search Report and Written Opinion, PCT Application No. PCT/US2021/045252, dated Nov. 30, 2021, ten pages.

(Continued)

*Primary Examiner* — Michael R Neff
(74) *Attorney, Agent, or Firm* — Fenwick & West LLP

(57) ABSTRACT

A vision based light detection and ranging (LIDAR) system detects motion of a targeted object using a dynamic vision sensor to locate and track the targeted object. The dynamic vision sensor identifies activity events associated with the motion of the targeted object based on changes in brightness detected at pixels of the dynamic vision sensor. Based on the identified events, the vision based LIDAR system predicts a location of the targeted object and directs a tracking beam onto one or more spots on the targeted object and determines distances to the one or more spots to track the motion of the targeted object in three dimensions.

20 Claims, 7 Drawing Sheets

(56) References Cited

U.S. PATENT DOCUMENTS

2020/0058205 A1    2/2020   Yaffe et al.
2020/0249017 A1    8/2020   Török et al.

OTHER PUBLICATIONS

Taiwan Intellectual Property Administration, Office Action, TW Patent Application No. 110130886, dated Feb. 25, 2022, 13 pages (with concise explanation of relevance).

\* cited by examiner

VISION BASED LIGHT DETECTION AND RANGING SYSTEM USING DYNAMIC VISION SENSOR

BACKGROUND

The present disclosure relates to a vision based light detection and ranging (LIDAR) system including a dynamic vision sensor for detecting motion of a targeted object and tracking the motion of the targeted object based on a distance to the targeted object.

In a conventional method for measuring distance to a targeted object, a depth map is generated using LIDAR systems and time of flight (ToF) systems. These systems use a raster scan or illuminate a full field of view to generate an entire depth map of an area. After generating the depth map, the targeted object is identified in the depth map and distance to the targeted object is determined from the depth map. The conventional method requires trade-offs in speed, resolution, power consumption, and computation.

SUMMARY

Embodiments relate to a vision based light detection and ranging (LIDAR) system that identifies activity events associated with motion of a targeted object using a dynamic vision sensor (DVS) camera and directs a tracking beam onto one or more spots on a targeted object based on the activity events. The DVS camera measures brightness changes at each pixel independently and asynchronously outputs pixel event data that indicates locations of pixels with brightness change greater than a predetermined threshold. Because the DVS camera is not restricted by frame rate for capturing images, the DVS camera can track the motion of the targeted object at a faster rate. Additionally, the DVS camera outputs pixel event data associated with the pixels with brightness change instead of all of the pixels, thereby reducing the amount of data for processing. The vision based LIDAR system identifies activity events representative of the motion of the targeted object based on the pixel event data. After identifying the activity events corresponding to the motion of the targeted object, the vision based LIDAR system directs a tracking beam onto the one or more spots on the targeted object and determines distances to the one or more spots by detecting a portion of the tracking beam reflected from the one or more spots.

In one or more embodiments, the activity events are identified based on one or more pixel events corresponding to the changes in brightness detected by one or more first pixels of the dynamic vision sensor responsive to the motion of the targeted object. The vision based LIDAR system generates a tracking control signal for directing the tracking beam based on locations of the one or more first pixels in the DVS camera that detected changes in brightness.

In one or more embodiments, the vision based LIDAR system includes a frame-based camera with an image sensor configured to capture images including the targeted object. The vision based LIDAR system can perform image processing on the captured images to identify one or more second pixels corresponding to the targeted object in the images and generate the tracking control signal based on locations of the one or more second pixels in the images.

In one or more embodiments, the vision based LIDAR system applies a machine-learned model to the activity events from the DVS camera and captured images from the image sensor to identify the targeted object and selects the one or more spots on the targeted object to track based on the identification.

In one or more embodiments, the vision based LIDAR system detects motion of additional targeted objects.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a vision based light detection and ranging (LIDAR) system that detects motion of a targeted object using a DVS camera to predict a location of the targeted object and directs a tracking beam to one or more spots on the targeted object based on the detected motion to determine distances to the one or more spots. As the targeted object moves, the DVS camera detects changes in brightness caused by the motion at one or more pixels of the DVS camera. Each of the one or more pixels that detected change in brightness outputs pixel event data used to determine activity events associated with the motion. The vision based LIDAR system predicts a location of the targeted object for directing the tracking beam onto the one or more spots on the targeted objects. The tracking beam is used to determine a distance between the vision based LIDAR system and the targeted object, which allows the vision based LIDAR system track the motion of the targeted object in three dimensions. As the targeted object moves, the vision based LIDAR system tracks the targeted object by continuing to direct the tracking beam onto the one or more spots based on the activity events.

Figure 1A:
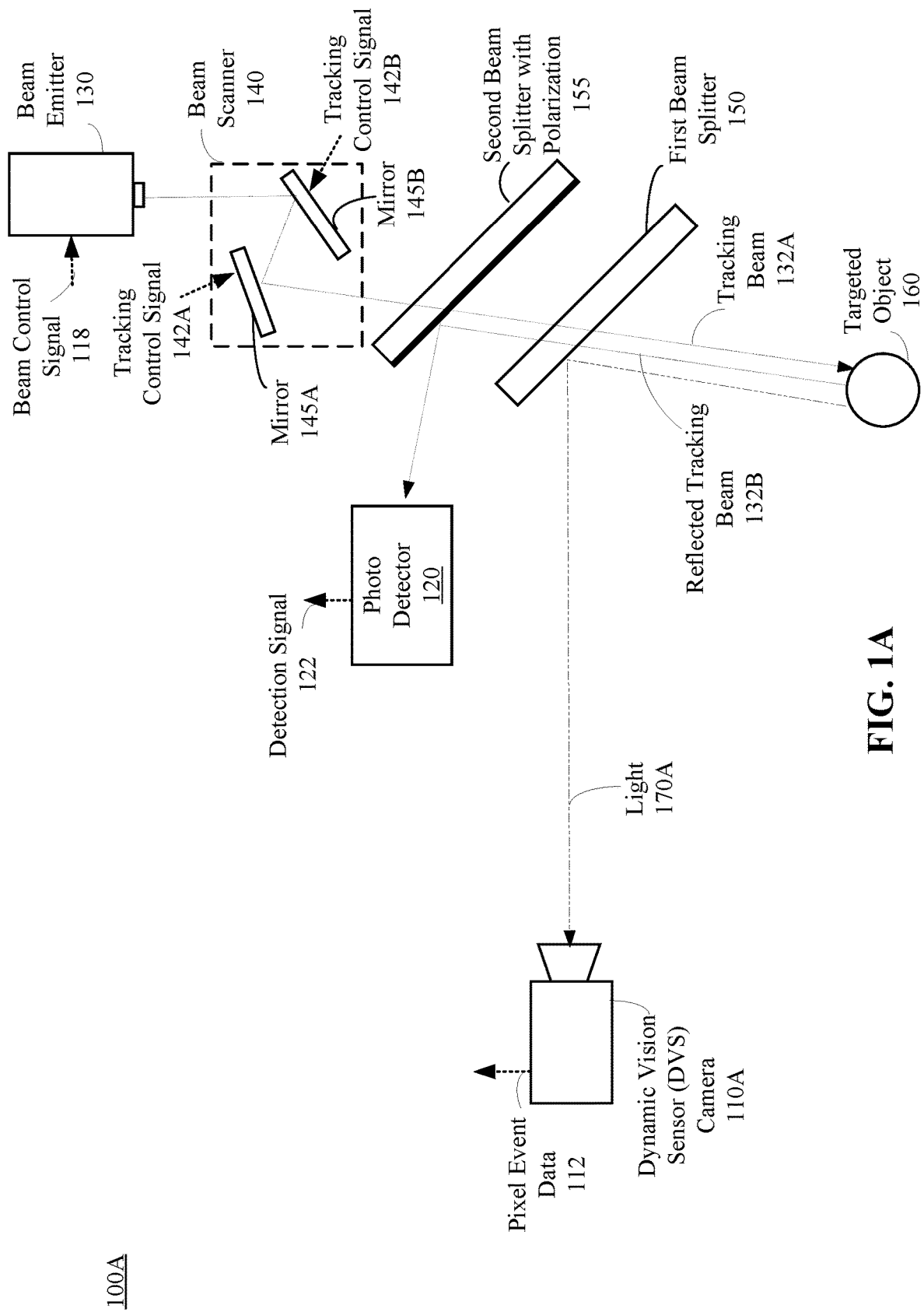
FIG. 1A is a schematic diagram of a vision based light detection and ranging (LIDAR) system including a dynamic vision sensor (DVS) camera, in accordance with one embodiment.

FIG. 1A is a schematic diagram of a vision based light detection and ranging (LIDAR) system 100A including a dynamic vision sensor (DVS) camera 110A, in accordance with one embodiment. The vision based LIDAR system 100A detects motion of a targeted object 160 using the DVS camera 110A. The vision based LIDAR system 100A determines one or more distances to one or more different spots on the targeted object 160 using a tracking beam 132A. The vision based LIDAR system 100A may include, among other components, the DVS camera 110A, a photo detector 120, a beam emitter 130, a beam scanner 140, a first beam splitter 150, and a second beam splitter with polarization 155.

The DVS camera 110A detects motion of the targeted object 160 based on light 170A reflected by the targeted object 160 and outputs pixel event data 112 including information associated with brightness changes in one or more pixels of the DVS camera 110A due to the motion. The light 170A may be ambient light that is reflected off the targeted object 160. As the targeted object moves, the DVS camera 110A detects activity events corresponding to the motion based on changes in brightness caused by the motion detected at one or more pixels of the DVS camera 110A. The term "activity event" as used herein may refer to motion or other activities associated with the targeted object that results in change in brightness in a scene captured by the DVS camera 110A. A "pixel event" described herein refers to detection of brightness change greater than a predetermined threshold at a pixel of the DVS camera 110A. As the targeted object 160 moves, the way that light 170A is reflected off the surface of the targeted object 160 changes and causes brightness changes at different pixels of the DVS camera 110A. Although not illustrated, the DVS camera 110A can simultaneously detect motion of multiple targeted objects 160 within its field of view.

The DVS camera 110A includes a DVS sensor that detects local changes in brightness. Each pixel of the DVS camera 110A stores a previous brightness and continuously compares it to a current brightness detected at the pixel. When a difference between the current brightness and the previous brightness is greater than a predetermined threshold, the pixel identifies the change in brightness as a pixel event. When a pixel detects a brightness different greater than the predetermined threshold, the DVS camera 110A generates pixel event data 112 associated with the detection and updates the previous brightness at the pixel with the current brightness to be used as a reference in future detections at the pixel. The pixel event data 112 includes a packet of information for each occurrence of brightness change greater than the predetermined threshold at a particular pixel. The packet of information may include a pixel location of the pixel that detected changes in brightness, amount of the change in brightness, polarity of the brightness changes (e.g., darker or lighter), and a time stamp of the pixel event. The pixel event data 112 may be provided to a processor (e.g., image signal processor 315) to be used for identifying activity events and generating tracking control signals 142 for directing the tracking beam 132 to the targeted object 160. Details on generating the tracking control signals 142 will be discussed below with respect to FIG. 4.

A conventional frame-based camera captures image frames using a shutter to expose all or rows of pixels for a period of time at a fixed frame rate, while the DVS camera 110A identifies pixel events as changes in brightness occur. Pixels of the DVS sensor operate independently and asynchronously allowing the DVS camera 110A to track the targeted object 160 at a faster rate compared to a conventional frame-based camera. For example, a conventional frame-based camera may have a frame rate of 120 frames per second allowing tracking of an object that is 100×100 in pixel size at about 120 times per second. In comparison, the DVS camera 110A may have a pixel event rate of 10,000,000 pixel events per second allowing tracking of the same object that is 100×100 in pixel size at about 1,000 times per second, more than 8 times faster than the frame-based camera. As described above, a pixel event refers to a change in brightness that exceeds a threshold value detected at a particular pixel. Because the DVS camera 110A can generate motion information at a faster rate than the frame-based camera, the vision based LIDAR system 100A can track the target object 160 accurately and smoothly even when the target object 160 moves at a fast speed.

Compared to conventional frame-based cameras, the DVS camera 110A outputs a smaller amount of data. To detect activity events corresponding to the motion of a targeted object 160 based on images captured by frame-based cameras, an image processor receives an entire frame of image including the targeted object 160, processes the frame of image to identify the targeted object 160, and compares the position of the targeted object 160 in the image to the position of the targeted object 160 in a previous frame of image to determine a change between the two frames. Sometimes, frames include image data corresponding to a surrounding area of the targeted object 160 that is irrelevant for tracking the targeted object 160. However, the irrelevant image data is still processed for identifying the targeted object 160, which is inefficient. Because the DVS camera 110A does not generate an entire image frame and instead only generates pixel event data 112 for pixels that detected changes in brightness, the amount of data to be processed is reduced. Among other advantages, the reduced amount of data improves processing speed of the vision based LIDAR system 100A which allows the vision based LIDAR system 100A to track the targeted object 160 precisely even when the targeted object 160 is moving at high speed. Further, with reduced amount of data, the vision based LIDAR system 100A may use a lower powered memory and processor, which lowers cost, power usage, and size of the LIDAR based system 100A.

Additionally, because DVS camera 110A detects local changes in brightness, it is not restricted by lighting conditions in the environment. Unlike a frame-based camera that suffers in image quality when overexposed or underexposed to light, the DVS camera 110A can perform detection as long as the lighting conditions allow the pixels to detect sufficient brightness difference, so the absolute brightness level is not as important. Among other advantages, the ability to operate in a wider range of lighting conditions allows the vision based LIDAR system 100A to be used in additional applications.

The beam emitter 130 emits the tracking beam 132A according to a beam control signal 118. The beam emitter 130 may be a laser diode or a vertical cavity surface emitting laser (VCSEL). The beam emitter 130 may emit a signal tracking beam 132A or emit multiple tracking beams 132A at a time. The beam control signal 118 may control a time at which the tracking beam 132A is emitted as well as parameters of the tracking beam 132A emission length, frequency, and/or intensity.

The photo detector 120 detects a reflected tracking beam 132B after being reflected off a surface of the targeted object 160. In some embodiments, the photo detector 120 may be a photo diode or a single photon avalanche diode (SPAD).

After the tracking beam 132A is emitted by the beam emitter 130, the tracking beam 132A is reflected by the targeted object 160 and the reflected tracking beam 132B enters the photo detector 120. A distance from the vision based LIDAR system 100A to a spot on the targeted object 160 may be determined, for example, by measuring elapsed time between a time at which the tracking beam 132A is emitted by the beam emitter 130 and a time at which the reflected tracking beam 132B is detected by the photo detector 120, using a conventional method that is well known in the art. The photo detector 120 may generate a detection signal 122 after detecting the reflected tracking beam 132B indicating a time of detection to be used in determining the distance. The DVS camera 110A allows the vision based LIDAR system 100A to precisely track the targeted object 160 that may be moving at a fast speed in two dimensions as the targeted object 160 moves along its trajectory. With the distance to the targeted object 160 determined based on the tracking beam 132A, the vision based LIDAR system 100A can track the motion of the targeted object in three dimensions.

The beam scanner 140 directs the tracking beam 132A emitted by the beam emitter 130 onto the targeted object 160 according to tracking control signals 142A, 142B. In some embodiments, the beam scanner 140 is a 2D galvanometer mirror or a 2D microelectromechanical system (MEMS) mirror. The beam scanner 140 may include one or more mirrors 145A, 145B that change orientations based on the tracking control signals 142A, 142B to direct the tracking beam 132A to one or more spots on the targeted object 160 determined based on pixel locations corresponding to the pixel event data 112. The tracking control signal 142A, 142B may represent variations in voltage supplied to an actuator in the beam scanner 140. For example, the mirror 145A may rotate about a horizontal axis according to the tracking control signal 142A and the mirror 145B may rotate about a vertical axis according to the tracking control signal 142B. The combination of the two mirrors permits the beam scanner 140 to direct the tracking beam 132A in any direction in a three dimensional space, and the tracking control signals 142A, 142B may provide instructions to adjust the positions of the two mirrors to direct the tracking beam 132A to one or more spots on the targeted object 160. In another example, the beam scanner 140 may include one mirror that can rotate in multiple dimensions and direct the tracking beam 132A in any direction in a three dimensional space.

The beam scanner 140 can direct the tracking beam 132A precisely onto the targeted object 160 because it has fine angular resolution and fast response time. In one example, mirrors 145A, 145B have angular resolutions of 0.025 degrees and step response times of 100 μs. If the targeted object 160 is moving, the tracking control signals 142A, 142B can be updated such that the mirrors 145A, 145B in the beam scanner 140 are adjusted to track the motion of the targeted object 160. In another example, multiple targeted object 160 may be tracked by the vision based LIDAR system 100A, and the tracking control signals 142A, 142B are updated to direct the tracking beam 132A onto the multiple targeted object 160 based on pixel event data 112 corresponding to the motion of multiple targeted object 160. Because the mirrors 145A, 145B have a step response time that is a fraction of a second, it can effectively direct the tracking beam 132A onto multiple targeted object 160. In yet another example, the tracking beam 132A may be directed onto a plurality of spots on the targeted object 160 to determine distances to the plurality of different spots on the targeted object 160, which permits the vision based LIDAR system 100A to determine information such as depth, contours, and orientation of the targeted object 160 that is not available from just the pixel event data 112. The plurality of spots may form a grid on the targeted object 160, and the beam scanner 140 may be configured to direct the tracking beam 132A to the plurality of different spots according to the tracking control signals 142A, 142B.

The second beam splitter with polarization 155 is an optical component that transmits the tracking beam 132A when incident upon a first surface and reflects the tracking 132B when incident upon a second surface that is opposite to the first surface. The second beam splitter with polarization 155 is placed within the vision based LIDAR system 100A to lie in a path of light between the beam emitter 130 and the targeted object 160 which partially overlaps with a path of light between the targeted object 160 and the photo detector 120. As shown in FIG. 1A, the tracking beam 132A that is directed onto the first surface of the second beam splitter with polarization 155 on the path between the beam emitter 130 and the targeted object 160 is transmitted. However, when the reflected tracking beam 132B on the path between the photo detector 120 and the targeted object 160 is incident upon the second surface of the second beam splitter with polarization 155, it is reflected at an angle. The second beam splitter with polarization 155 may have one or more filters for polarization applied to the second surface that causes the reflected tracking beam 132B to be reflected towards the photo detector 120.

The tracking beam 132A passing through the second beam splitter with polarization 155 on its path to the targeted object 160 also passes through the first beam splitter 150. The first beam splitter 150 is disposed in the path of the tracking beam 132A between the beam emitter 130 and the targeted object 160, in the path of the reflected tracking beam 132B between the targeted object 160 and the photo detector 120, and in the path of light 170A between the targeted object 160 and the DVS camera 110A. The first beam splitter 150 may have one or more filters to transmit the tracking beam 132A, 132B, but reflect light 170A in the visible spectrum towards the DVS camera 110A.

Figure 1B:
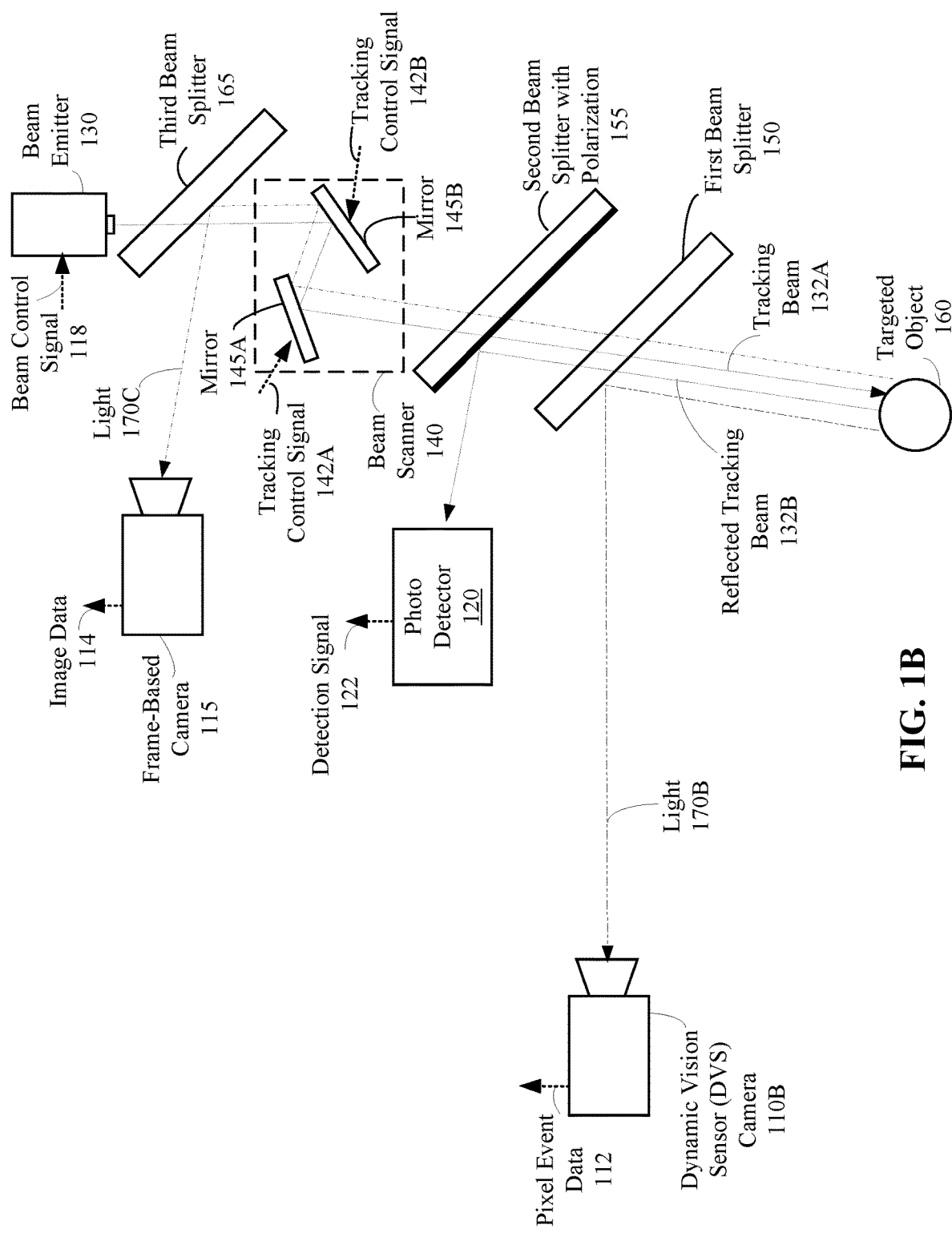
FIG. 1B is a schematic diagram of a vision based LIDAR system including a DVS camera and a frame-based camera, in accordance with one embodiment.

FIG. 1B is a schematic diagram of a vision based LIDAR system 100B including a DVS camera 110B and a frame-based camera 115, in accordance with one embodiment. The vision based LIDAR system 100B is a variation of the vision based LIDAR system 100A of FIG. 1A, and description of elements discussed above with respect to FIG. 1A is omitted to avoid redundancy. The vision based LIDAR system 100B includes the frame-based camera 115 and a third beam splitter 165 in addition to the components in the vision based LIDAR system 100A of FIG. 1A. The frame-based camera 115 includes an image sensor that captures images of the targeted object 160 at a predetermined frame rate controlled by a shutter and outputs image data 114 corresponding to the images. Although the DVS camera 110B is effective at detecting motion, the DVS camera 110B may not capture images (e.g., RGB images, black and white images) of entire environment including the targeted object 160 at a particular instance. Further, because DVS camera 110B detects changes in brightness, when the targeted object 160 remains stationary without brightness changes, the DVS camera 110B may not detect the targeted object 160. Therefore, the frame-based camera 115 may supplement the DVS camera 110B by capturing the image frames of the entire environment alongside the pixel events detected by the DVS camera 110B.

To capture the images, the frame-based camera 115 receives light 170C representative of the targeted object 160 while the DVS camera 110B receives light 170B. The light 170C may be ambient light that is reflected off the targeted object 160. The light 170C passes through the first beam splitter 150 and the second beam splitter with polarization 155 before being directed onto the third beam splitter 165 by the beam scanner 140. Finally, the light 170C is reflected by the third-beam splitter 165 to enter the frame-based camera 115 for capturing and generating of the image data 114. In each image frame, the pixels of the frame-based camera 115 record information based on light exposure and outputs the image data 114 from all of the pixels.

Among other benefits, the vision based LIDAR system 100B that includes the frame-based camera 115 may capture centered images of the targeted object 160 as it moves. As illustrated in FIG. 1B, the beam scanner 140 is used to direct the tracking beam 132A onto the targeted object 160 as well as direct the light 170 into the frame-based camera 115. That is, the beam scanner 140 controls the field of view of the frame-based camera 115. The tracking beam 132A and the image data 114 are synchronized such that the distance determined based on the tracking beam 132A corresponds to a frame of image captured by the frame-based camera 115. Therefore, the vision based LIDAR system 100B can determine a location of the targeted object 160 in three-dimensions corresponding to a time at which the frame of image was captured.

As another benefit, the vision based LIDAR system 100B may use the image data 114 to improve performance of identifying and tracking the targeted object 160. In some embodiments, information from pixel event data 112 output by the DVS camera 110B may be lacking, and the image data 114 may be used to supplement the analysis. For example, the field of view of the DVS camera 110B may be wider than the field of view of the frame-based camera 115. Although the DVS camera 110B can identify targeted objects 160 from a wide area, the resolution of the pixel may be lower than the frame-based camera 115. When the targeted object 160 is located far away from the vision based LIDAR system 100B, the DVS camera 110B may not detect a sufficient number of pixel events representative of the motion of the targeted object 160 to identify activity events and track the targeted object 160. However, frame-based camera 115 may be able to capture higher resolution image of the targeted object 160 if it lies in the field of view of the frame-based camera 115. Using image recognition on the image data 114, the vision based LIDAR system 100B may detect the targeted object 160 and direct the tracking beam 132A onto one or more spots on the targeted object 160 even though the DVS camera 110B missed the targeted object 160.

Because the frame rate of the frame-based camera 115 is slower than the rate at which the DVS camera 110B detects pixel events, analysis based on the image data 114 may occur less frequently. That is, the vision based LIDAR system 100B may primarily use the pixel event data 112 from the DVS camera 110B to predict the location of the targeted object 160 and control the tracking beam and use the image data 114 for object detection and/or verifying the object detection and tracking.

In some embodiments, the frame-based camera 115 may be disposed at a different position within the vision based LIDAR system 100B. For example, the frame-based camera 115 may be placed such that the light 170C is not directed into the frame-based camera 115 by the beam scanner 140. Instead, the light 170C may directly be captured by the frame-based camera 115 after being reflected by the targeted object 160.

Figure 2A:
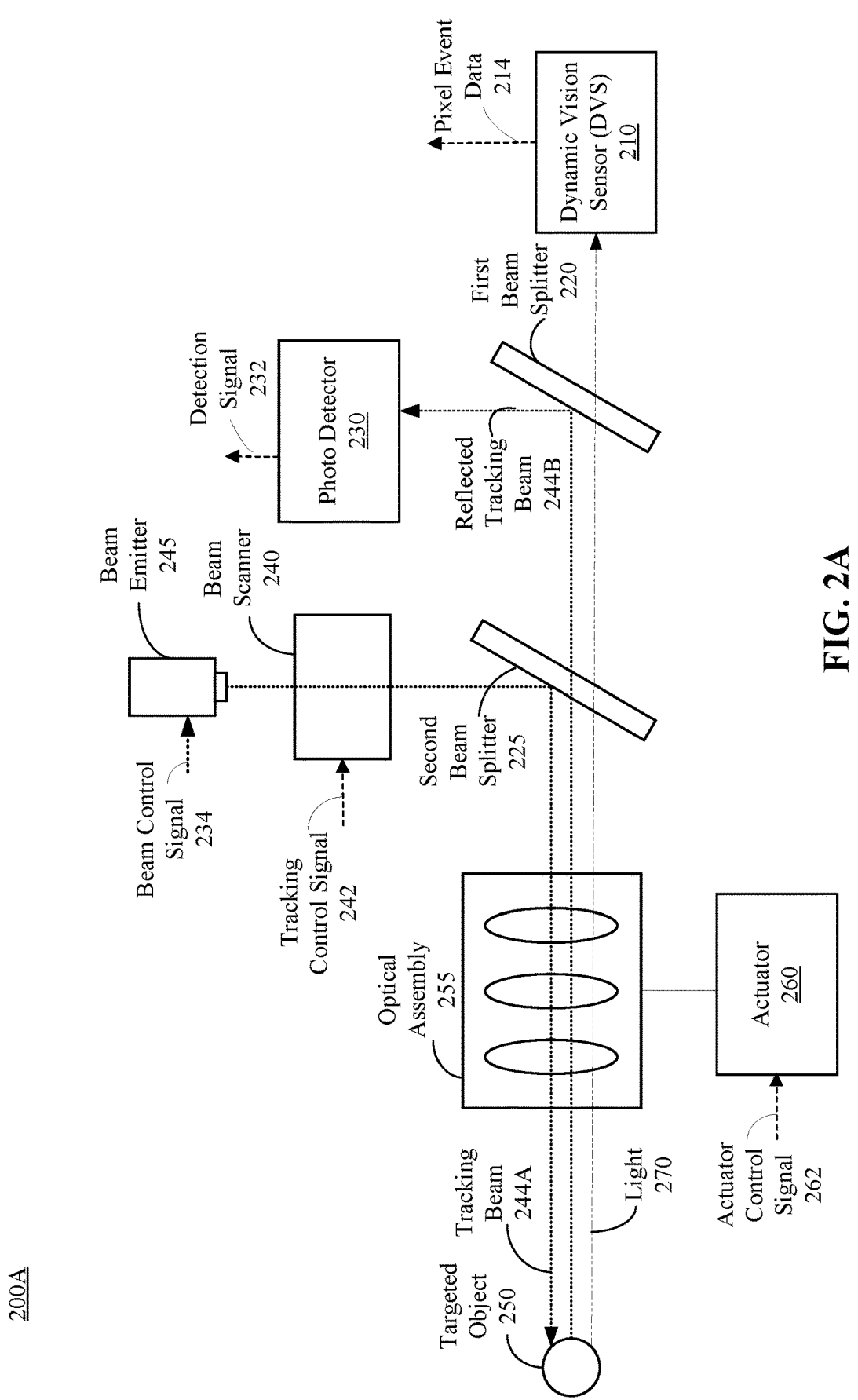
FIG. 2A is a schematic diagram of a vision based LIDAR system including a DVS sensor, in accordance with one embodiment.

FIG. 2A is a schematic diagram of a vision based LIDAR system 200A including a DVS sensor 210, in accordance with one embodiment. The vision based LIDAR system 200A may include, among other components, a dynamic vision sensor (DVS) 210, a first beam splitter 220, a second beam splitter 225, a photo detector 230, a beam scanner 240, a beam emitter 245, optical assembly 255, and actuator 260. Description for elements discussed above with respect to FIGS. 1A and 1B is omitted to avoid redundancy.

The DVS 210 is a hardware component that receives light 270 representing the targeted object 250 through the optical assembly 255, the second beam splitter 225, and the first beam splitter 220. The light 270 is reflected by the surface of the targeted object 250, and the DVS 210 detects change in brightness due to the motion of the targeted object 250 in one or more pixels and outputs pixel event data 214 corresponding to the detected brightness changes. The pixel event data 214 is used to generate beam control signal 234 that controls the beam emitter 245 to adjust emission properties of the tracking beam 244A such as emission length, frequency, and/or intensity. The pixel event data 214 is also be used to generate the tracking control signal 242 that causes the beam scanner 240 to direct the tracking beam 244A onto the targeted object 250.

The optics assembly 255 is a combination of optical elements that enable adjusting optical properties of the DVS 210 and directing one or more tracking beams 244A onto the targeted object 250. For this purpose, the optical assembly 255 includes one or more optical elements such as lenses, filters, mirrors, and polarizers to change, for example, the focal points and characteristics of the light 270 passing through the optical assembly 255. One or more of these optical elements are adjusted by the actuator 260. The actuator 260 may receive an actuator control signal 262 that causes the actuator 260 to adjust the one or more optical elements. In other embodiments, the optical assembly 255 may be a static component, and the vision based LIDAR system 200A may not include the actuator 260.

After the light 270 passes through the optical assembly 255, the light 270 passes through the second beam splitter 225 and the first beam splitter 220 before reaching the DVS 210. The DVS 210 generates pixel event data 214 corresponding to changes in brightness detected at one or more pixels based on the light 270. As the targeted object 250 moves, the motion causes light 270 reflected by the surface of the targeted object 250 to reach the DVS 210 differently. The pixel event data 214 indicates a pixel location at which change in brightness was detected, an amount of change, a polarity of the change, and a time stamp associated with the change for each pixel event. Using the pixel event data 214, the vision based LIDAR system 200A may predict a two-dimensional location of the targeted object 250 and determine a distance to the targeted object 250 using the tracking beam 244A in a third-dimension. Therefore, the vision based LIDAR system 200A can track the location of the targeted object 250 in three-dimensions.

The beam emitter 245 and the photo diode 230, in combination, form a distance sensor that determines distances to one or more spots on the target object 250. The beam emitter 245 emits one or more tracking beams 244A onto the one or more spots by the beam scanner 240, the second beam splitter 225, and the optical assembly 255. In one embodiment, the beam emitter 245 emits a single tracking beam 244A that is projected as a single light point onto the targeted object 250 by controlling the beam scanner 240. The beam scanner 240 may include one or more mirrors to direct a direction of the tracking beam 245A according to the tracking control signal 242. In another embodiment, the tracking beam 244A may be projected as multiple light points or a point cloud onto the targeted object 250 by directing the tracking beam 244A onto a plurality of spots on the targeted object 250 using the beam scanner 240. In yet another embodiment, the beam emitter 245 may include a plurality of beam sources that emit a plurality of tracking beams 245A via different light paths onto a plurality of spots on the targeted object 250, for example, in a grid pattern. The beam emitter 245 may be embodied, for example, as a vertical cavity surface emitting laser (VCSEL) that simultaneously emits multiple tracking beams.

After the beam scanner 240 directs the tracking beam 244A in a direction corresponding to the predicted location of the targeted object 250 determined based on the pixel event data 214 from the DVS 210, the tracking beam 244A is reflected by the second beam splitter 225 towards the optical assembly 255. The tracking beam 244A passes through the optics assembly 255 before getting reflected by the targeted object 250.

The reflected tracking beam 244B is transmitted through the second beam splitter 225. When the reflected tracking beam 244B is incident on the first beam splitter 220, the reflected tracking beam 244B is reflected at an angle toward the photo detector 230. The photo detector 230 detects the reflected tracking beam 244B and generates detection signal 232 indicating a time at which the reflected tracking beam 244B reached the photo detector 230. By determining a duration of time between the time at which the tracking beam 244A was emitted and the time at which the tracking beam 244B was detected by the photo detector 230, the distance between the vision based LIDAR system 200B and the targeted object 250 can be determined.

Figure 2B:
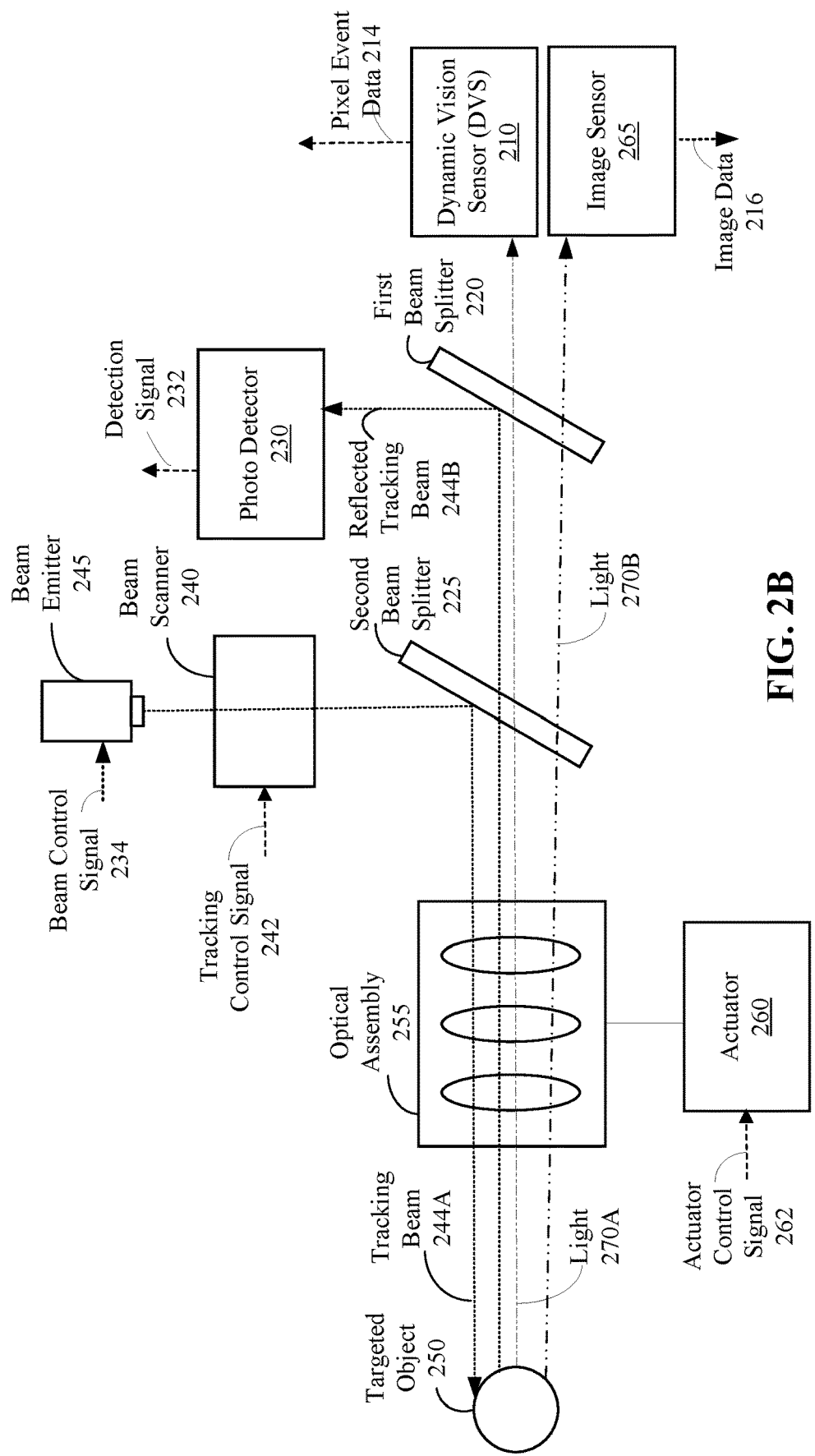
FIG. 2B is a schematic diagram of a vision based LIDAR system including a DVS sensor and an image sensor, in accordance with one embodiment.

FIG. 2B is a schematic diagram of a vision based LIDAR system 200B including a DVS sensor 210 and an image sensor 265, in accordance with one embodiment. The vision based LIDAR system 200B is a variation of the vision first LIDAR system 200A of FIG. 2A and further includes an image sensor 265. The image sensor 265 captures frames of images (e.g., RGB images, black and white images) including the targeted object 250 using light 270B reflected off the targeted object 250 and outputs image data 216 corresponding to the captured frames.

Similar to the vision based LIDAR system 100B illustrated in FIG. 1B, the vision based LIDAR system 200B generates image data 216 using the image sensor 265 in addition to generating pixel event data 214 using the DVS 210. However, in the vision based LIDAR system 200B, the image sensor 265 is not placed behind the beam scanner 240 and has a fixed FOV unlike the frame-based camera 115 of the vision based LIDAR system 100B. In some embodiments, the DVS 210 and the image sensor 265 may be combined into a single device. When the DVS 210 and the image sensor 265 are merged into a single device, the vision based LIDAR system 100B may be more compact.

Figure 3:
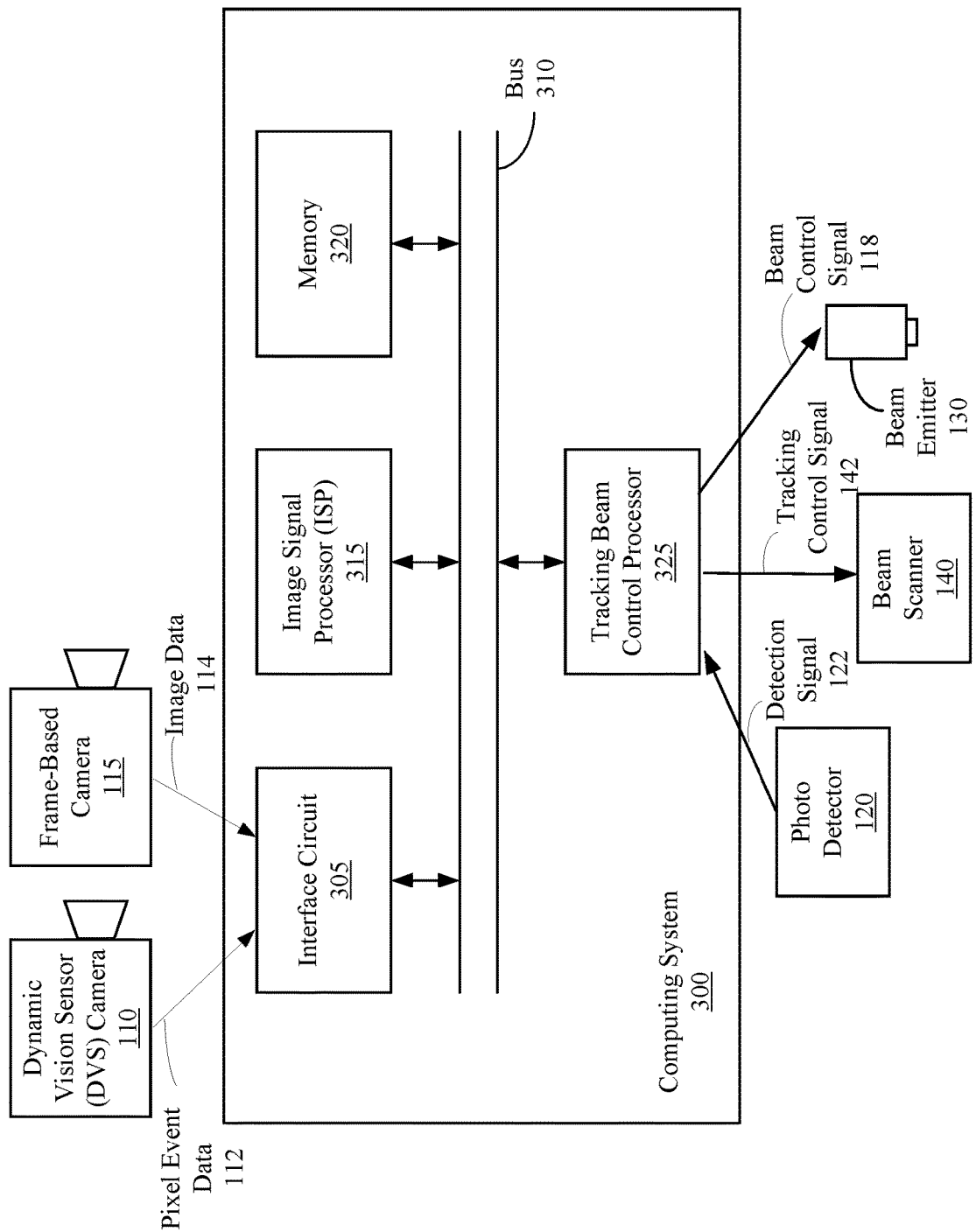
FIG. 3 is a block diagram illustrating a computing system for operating a vision based LIDAR system, in accordance with one embodiment.

FIG. 3 is a block diagram illustrating a computing system 300 for operating a vision based LIDAR system, in accordance with one embodiment. The computing system 300 includes an interface circuit 305, a bus 310, an image signal processor (ISP) 315, a memory 320, and a tracking beam control processor 325. FIG. 3 illustrates a computing system 300 used for the vision based LIDAR system 100B described with respect to FIG. 1B. Other embodiments of the computing system 300 for different embodiments may have different architecture.

The DVS camera 110B detects changes in brightness in pixels and outputs pixel event data 112 to the interface circuit 305 that connects the DVS camera 110B to the bus 310. The frame-based camera 115 captures images and provides image data 114 to the interface circuit 305 that also connects the frame-based camera 115 to the bus 310. The bus 310 may be used to facilitate communication about the ISP 315, the memory 320, and the tracking beam control processor 325, for example, according to inter-integrated circuit (IC2) protocol or serial peripheral protocol (SPI). In some embodiments, the pixel event data 112 and the image data 114 may be provided to the ISP 315 without the bus 310.

The ISP 315 performs image signal processing on the pixel event data 112 and the image data 114 received through the interface circuit 305. The ISP 315 may identify a targeted object from the pixel event data 112 and/or the image data 114 and predict the location of the targeted object. The ISP 315 may identify the targeted object using, for example, one or more edge detection, deep learning, Hough transform, Kalman filter, spatial filter, temporal filter, and other object recognition methods. The ISP 315 may also perform cropping, scaling, generating motion vector, autofocus control or image enhancement to improve accuracy of the object identification and compensate for blurriness, distortion, and/or incorrect position. In some embodiments, low level computing such as applying pre-processing filters to the images may be performed by the DVS camera 110B and the frame-based camera 115, and/or the interface circuit 305. The ISP 315 is connected to the memory 320 via the bus 310.

The memory 320 stores data and instructions until read by the ISP 315. The memory 320 may be a dynamic random-access memory (DRAM). Details on the memory 320 is described with respect to FIG. 4.

The tracking beam control processor 325 is connected to the photo detector 120, the beam emitter 130, and the beam scanner 140. The tracking beam control processor 325 generates the beam control signal 118 to instruct the beam emitter 130 to emit one or more tracking beams 132A and generates the tracking control signal 142 to move light guiding elements such as mirrors in the beam scanner 140 to direct the one or more tracking beams 132A onto the targeted object 160. The tracking beam control processor 325 receives the detection signal 122 from the photo detector 120 that detects the one or more reflected tracking beams 132B after having been reflected by the targeted object 160. Based on the detection signal 122, the tracking beam control processor 325 may determine distances to one or more spots on the targeted object 160.

Elements of the computing system 300 illustrated in FIG. 3 are exemplary only, and elements may be added or removed without departing from the scope of the disclosure. Further, the structure of the computing system 300 is not limited hereto and may be implemented in a different structure. One or more elements of the computing system 300 may be embodied in separate hardware components. Alternatively, all the elements of the computing system 300 may be embodied in a single integrated chip.

Figure 4:
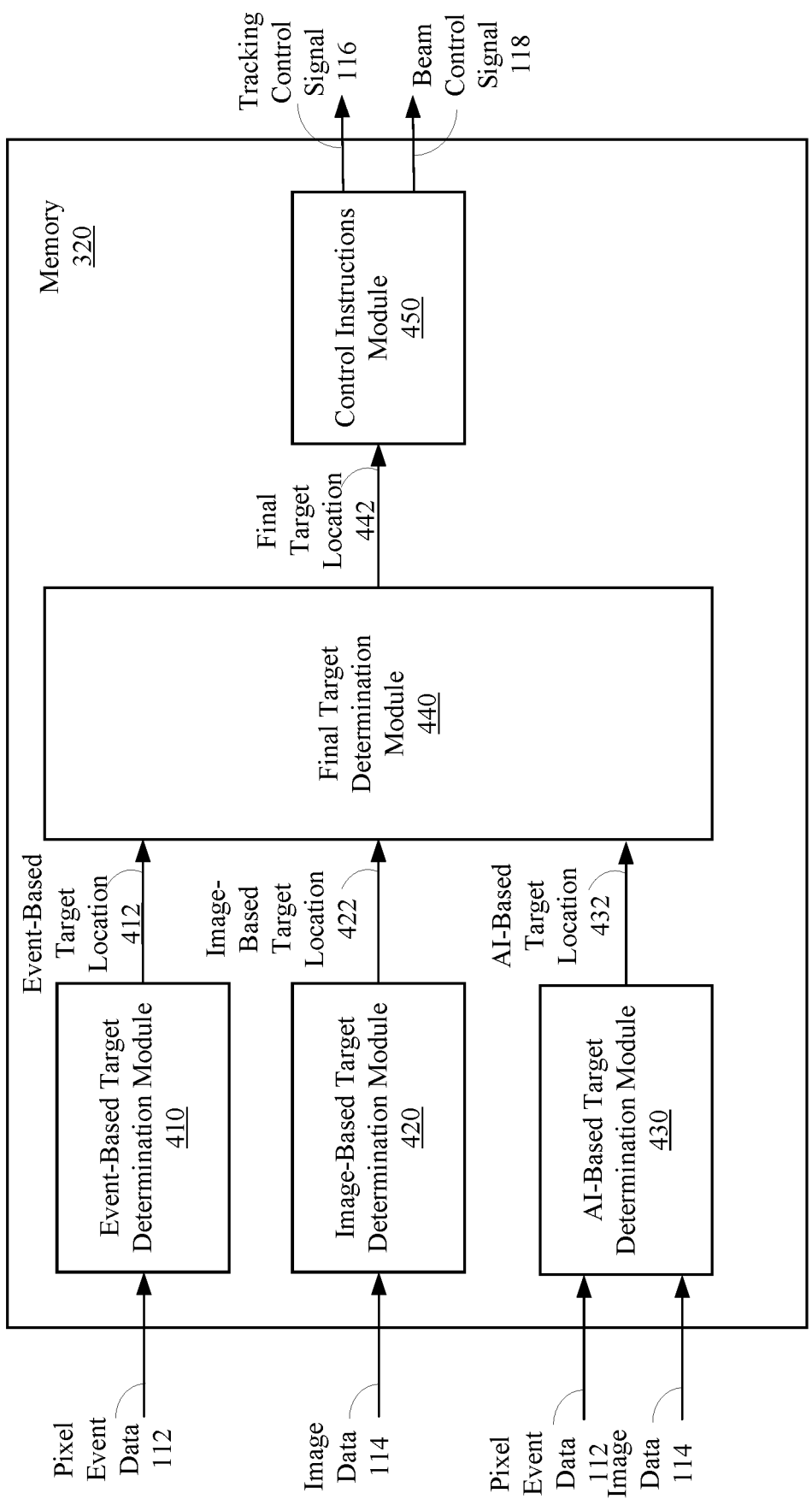
FIG. 4 is a block diagram illustrating software components in a memory of a vision based LIDAR system, in accordance with one embodiment.

FIG. 4 is a block diagram illustrating software components in memory 320 of a vision based LIDAR system, in accordance with one embodiment. The memory 320 includes an event-based target determination module 410, an image-based target determination module 420, an artificial intelligence (AI) target determination module 430, a final target determination module 440, and a control instructions module 450. FIG. 4 is described in the context of the vision based LIDAR system 100B. Other embodiments of the memory 320 may have different and/or additional modules.

The event-based target determination module 410 receives pixel event data 112 from the DVS camera 110B and determines one or more event-based target locations 412 based on the received pixel event data 112. The pixel event data 112 is a stream of information packets associated with activity events detected by pixels in the DVS camera 110, where each activity event corresponds to an occurrence of change in brightness in a region of pixels of the DVS camera 110B. For each activity event, the DVS camera 110B may output pixel event data 112 corresponding to a plurality of pixel events, each pixel event associated with a pixel location of the pixel that detected a change in brightness greater than a predetermined threshold, an amount of the change in brightness, a polarity of the brightness changes, and a time stamp associated with the pixel event.

From the pixel event data 112, the event-based target determination module 410 identifies activity events associated with one or more targeted objects 160 and predicts locations of the one or more targeted objects 160 based on pixel locations associated with the pixel event data 112. Since the pixel event data 112 includes packets of information associated with brightness changes at a pixel level, the event-based target determination module 410 may generate a map of pixels that detected changes in brightness based on pixel locations in the pixel event data 112 to identify a spatial and temporal relationship among the pixel events to identify the activity events associated with the one or more targeted objects 160. In some embodiments, the event-based target determination module 410 may identify activity events based on regions in the generated map that include a high density of pixels that detected change in brightness and generate bounding boxes around the regions. For each generated bounding box, the event-base target determination module 410 may determine a probability of the bounding box containing the targeted object 160. When a bounding box is associated with a probability greater than a predetermined threshold, the event-based target determination module 410 may determine that the bounding box corresponds to an activity event and output one or more event-based target locations 412 to the final target determination module 440. Each event-based target location 412 corresponds to a potential spot on the targeted object 160 to be tracked with the tracking beam 132A. In some embodiments, the event-based target determination module 410 may output the probability associated with the targeted object 160 with the one or more event-based target locations 412 to the final target determination module 440. In other embodiments, the event-based target determination module 410 may use other methods of identifying the activity events associated with the one or more targeted objects 160 in the pixel event data 112.

When the targeted object 160 is a large object such as a person or a vehicle, the motion of the targeted object 160 may be detected by a large number of pixels of the DVS camera 110B. The event-based target determination module 410 may select a subset of pixels in the bounding box as event-based target locations 412 to be provided to the final target determination module 440. In contrast, when the targeted object 160 is a small object such as a baseball, the event-based target determination module 410 may provide all of the pixels in the bounding box as event-based target location 412.

In some embodiments, the event-based target determination module 410 may perform filtering operations to remove noise from the pixel event data 112 to more accurately identify the targeted objects 160. For example, based on the map of pixels that detected a change in brightness, the event-based target determination module 410 may identify pixels that are not within a threshold distance to another pixel as noise and remove those pixels from being used to generate bounding boxes. The event-based target determination module 410 may perform additional data processing operations to improve the accuracy and efficiency of identifying the targeted objects 160. In some embodiments, one or more data processing operations discussed with respect to the event-based target determination module 410 may be performed in a processing circuit within the DVS camera 110B.

The image-based target determination module 420 receives image data 114 from the frame-based camera 115 and identifies the image-based target location 422 corresponding to the targeted object 160. The image-based target determination module 420 may include a computer model that identifies features in the image data 114 to identify the targeted objects 160. The image-based target determination module 420 may identify a type of object (e.g., identify a label "car" for a portion of the image data 114) and pixel locations or bounding box associated with the targeted object 160 in the image data 114. The image-based target determination module 420 may be implemented as a plurality of models that operate sequentially or in parallel to identify the candidate objects. For example, multiple models may operate in parallel to identify different types of targeted objects 160.

The image-based target determination module 420 may be implemented as a variety of machine-learned models or trainable networks. For example, the image-based target determination module 420 may be a neural network, decision tree, classifier, or other types of computer model, and any combination thereof, that identifies targeted objects 160 in the image data 114 and pixel locations of the targeted objects 160. The image-based target determination module 420 may be trained from a set of training data to learn weights and parameters for effectively performing the identification. The training data may include images of annotated targeted objects and known dimensions and shapes of the annotated targeted objects 160. For example, the images may include annotated regions containing labels of object types and bounding boxes that enclose the objects, preferably within the smallest area or volume possible. The complexity of these networks and input resolution of images to the network may affect the processing time and accuracy of the image-based target determination module 420.

For each of the detected targeted objects 160 in the image data 114, the image-based target determination module 420 may identify pixel locations associated with the detected targeted object 160 or a bounding box around the targeted object 160. The image-based target determination module 420 may also output a probability of the bounding box including the targeted object 160 and/or a predicted type of the targeted object 160 to the image-based target location 422. Based on the pixel locations or the bounding box, the image-based target determination module 420 determines one or more image-based target location 422 associated with the targeted object 160. For example, the image-based target determination module 420 may determine a center of the bounding box and output the center as the image-based target location 422 for the associated targeted object 160.

The AI-based target determination module 430 applies one or more machine-learned models to the received pixel event data 112 and image data 114 to output AI-based target locations 432. By using a combination of the pixel event data 112 and the image data 114, the AI-based target determination module 430 may detect targeted objects 160 more accurately. The AI-based target determination module 430 may be a neural network, decision tree, classifier, or other type of computer mode, or any combination thereof that detects targeted objects 160 and pixel locations associated with the targeted objects 160. In some embodiments, the AI-based target determination module 430 is trained using training data including pixel event data 112 and annotated image data 114 that include labels of various types of objects and bounding boxes around these objects. The AI-based target determination module 430 may learn a link between the pixel event data 112 and the image data 114 and identify additional features for detecting targeted objects 160 that are not apparent when the pixel event data 112 and the image data 114 are analyzed separately. Based on the received pixel event data 112 and image data 114, the AI-based target determination module 430 identifies one or more targeted objects 160 in the pixel event data 112 and the image data 114 and associated bounding boxes. For each bounding box, the AI-based target determination module 430 may determine a probability of the bounding box containing the identified targeted object 160. Based on the identification, the AI-based target location 432 selects one or more AI-based target locations 432 for each of the one or more targeted objects 160 that is output to the final target determination module 440.

In some embodiments, the AI-based target determination module 430 may be used when there is a discrepancy in the event-based target location 412 and the image-based target location 422 for a given targeted object 160. For example, when the image-based target determination module 420 detects a targeted object 160 but the event-based target determination module 410 fails to detect the same targeted object 160, the AI-based target determination module 430 may be used to verify whether the targeted object 160 is at the image-based target location 422. By only using AI-based target determination module 430 as needed, the vision based LIDAR system 100B may improve efficiency and reduce power consumption.

For vision based LIDAR systems with a DVS camera 110A but no frame-based cameras such as the vision based LIDAR system 100A illustrated in FIG. 1A, the AI-based target determination module 430 may receive just the pixel event data 112 and output the AI-based target location 432 by applying machine-learned models or trainable networks to the pixel event data 112. The AI-based target determination module 430 may be able to identify targeted objects 160 more accurately than the event-based target determination module 410 but may be more complex than the event-based target determination module 410. As such, the AI-based target determination module 430 may reduce computation efficiency and increase power consumption. In some embodiments, to optimize the computation efficiency and power consumption, the event-based target determination module 410 may first generate bounding boxes and probabilities of the bounding boxes containing a targeted object 160 and use the AI-based target determination module 430 only when necessary. For example, if the event-based target determination module 410 identifies a bounding box associated with a probability less than a predetermined threshold, the AI-based target determination module 430 may then apply the models on pixel event data 112 corresponding to the bounding box to calculate a new probability. If the new probability exceeds the predetermined threshold, the determination module 430 may determine one or more AI-based target locations 432 associated with the bounding box and output to the final target determination module 440. If the new probability is also less than the predetermined threshold, the AI-based target determination module 430 may confirm that there is no targeted object 160 and not output any AI-based target locations 432 for that bounding box.

The final target determination module 440 receives the event-based target location 412, the image-based target location 422, and the AI-based target location 432 and determines one or more final target locations 442 to be tracked using the tracking beam 132A. In some embodiments, the final target determination module 440 may select a final target location 442 to be tracked from the received target locations based in part on probabilities associated with the received target locations. For example, if the event-based target location 412 indicates that a particular targeted object 160 is at location x while the image-based target location 422 indicates that a particular targeted object 160 is at location y different from x, the final target determination module 400 may select location x associated with a probability of 80% over location y associated with a probability of 65% as the final target location 442 for the targeted object 160. In some embodiments, the final target determination module 440 may determine a final target location 442 different from the received target locations. For example, if the event-based target location 412, image-based target location 422, and AI-based target location 432 are not aligned, the final target determination module 440 may calculate a location that lies at a center of the received target locations for the final target location 442.

Because pixel event data 112 is output asynchronously by the DVS camera 110B and includes less information than the image data 114, the event-based target determination module 410 may process and output event-based target location 412 to the final target determination module 440 at a higher rate compared to the image-based target determination module 420 outputting the image-based target location 422 or the AI-based target determination module 430 outputting the AI-based target location 432. Both the image-based target determination module 420 and the AI-based target determination module 430 receive frames of images as image data 114 from the frame-based camera 115 at a slower rate than the image data 114 and require extensive computation to process entire image frames to detect the targeted object 160. As such, the final target determination module 440 may primarily rely on the event-based target determination module 410 to select the final target location 442 and use the image-based target location 422 and/or AI-based target location 432 less frequently.

The control instructions module 450 receives final target locations 442 and generates the tracking control signal 142 provided to the beam scanner 140 and generates the beam control signal 118 provided to the beam emitter 130 to direct the tracking beam 132A onto one or more spots on the identified targeted objects 160. Each final target location 442 corresponds to a spot to direct the tracking beam 132A to, and the control instructions module 450 generates the tracking control signal 142 for adjusting positions of mirrors in the beam scanner 140 to direct the tracking beam 132A onto the spot. The control instructions module 450 also determines emission properties such as emission length, frequency, and intensity of the tracking beam 132A and generates the beam control signal 118 based on the determined parameters. In some embodiments, the control instructions module 450 may receive predicted object types of the targeted objects 160 for determining the properties. For example, when the targeted object 160 is a person, the beam control signal 118 may correspond to a low intensity tracking beam to ensure eye safety.

Figure 5:
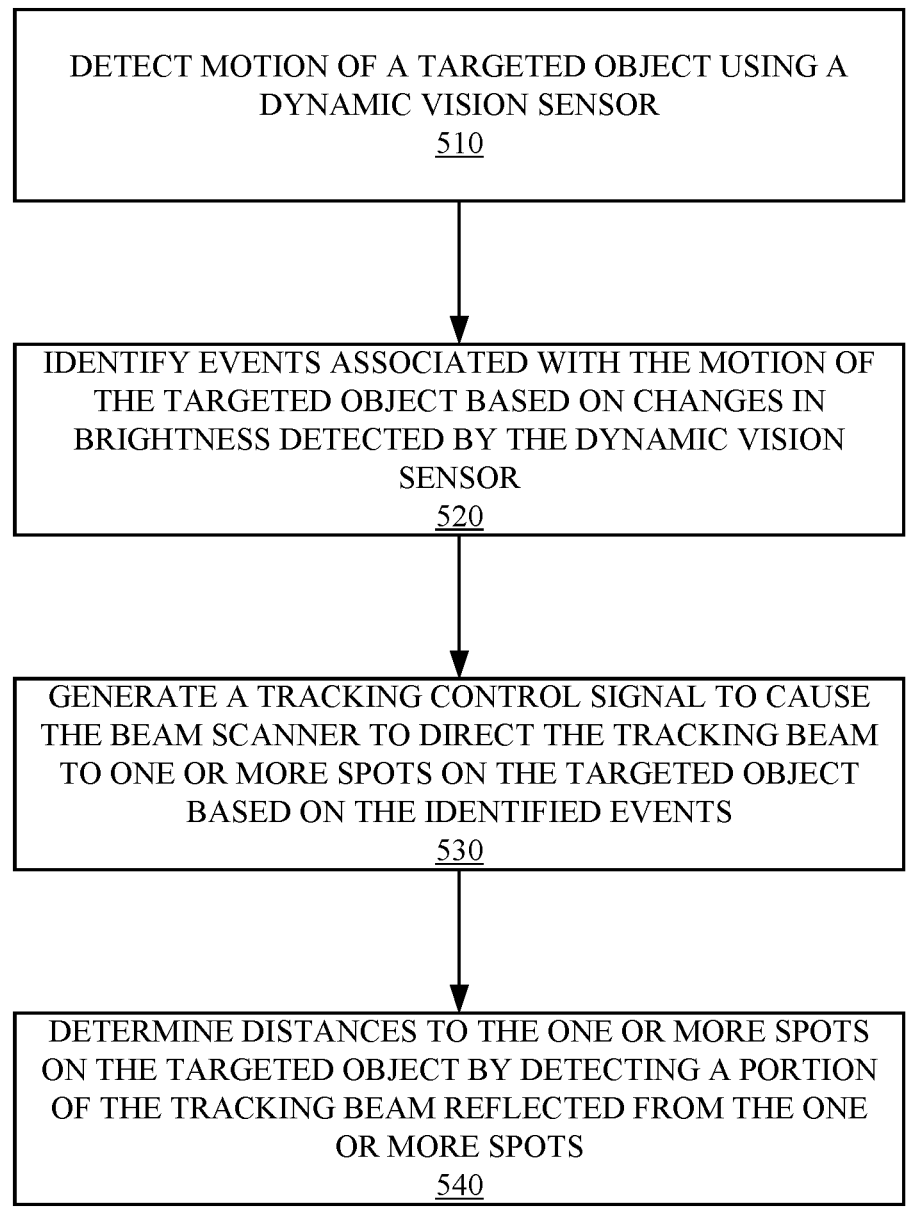
FIG. 5 is a flowchart depicting a process of operating a vision based LIDAR system, in accordance with one embodiment.

FIG. 5 is a flowchart depicting a process 500 of operating a vision based LIDAR system, in accordance with one embodiment. The vision based LIDAR system detects 510 motion of a targeted object using a dynamic vision sensor. Based on changes in brightness detected by the dynamic vision sensor, the vision based LIDAR system identifies 520 activity events associated with the motion of the targeted object. Each pixel in the dynamic vision sensor independently determines local changes in brightness and asynchronously outputs pixel event data associated with a change in brightness greater than a predetermined threshold at the pixel, polarity of the change, and a time stamp.

Based on the activity events, the vision based LIDAR system predicts a location of the targeted object and selects one or more spots to track using the tracking beam. The vision based LIDAR system generates 530 a tracking control signal to cause the beam scanner to direct the tracking beam to the one or more spots on the targeted object. After the tracking beam is directed onto the one or more spots, the vision based LIDAR system determines 540 distances to the one or more spots on the targeted object by detecting a portion of the tracking beam reflected from the one or more spots.

In some embodiments, the vision based LIDAR system may also include an image sensor (e.g., in a frame-based camera) that captures frames of images including the targeted object. The vision based LIDAR system may perform image processing to identify pixels corresponding to the targeted object in the images. Pixel locations corresponding to the targeted object may be used to generate the tracking control for directing the tracking beam.

In some embodiments, the vision based LIDAR system may use a machine-learned model that outputs target locations or spots on the targeted object to be tracked with the tracking beam. The machine-learned model may receive pixel event data from the dynamic vision sensor and/or image data from the image sensor as input to output the target locations.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

What is claimed is:

1. A vision based tracking system comprising:
a dynamic vision sensor configured to detect motion of a targeted object;
a beam scanner configured to direct a tracking beam onto one or more spots on the targeted object according to a tracking control signal;
a photo detector configured to detect a portion of the tracking beam reflected from the one or more spots on the targeted object;
a beam splitter configured to send the reflected tracking beam to the photo detector, and send light representing the targeted the object to the dynamic vision sensor; and
a processor operably coupled to the dynamic vision sensor, the beam scanner, and the photo detector, the processor configured to:
identify activity events associated with the motion of the targeted object based on changes in brightness of the light detected by the dynamic vision sensor;
generate a tracking control signal to cause the beam scanner to direct the tracking beam to the one or more spots on the targeted object based on the identified activity events; and
determine distances to the one or more spots on the targeted object.

2. The vision based tracking system of claim 1, wherein the activity events are identified based on one or more pixel events corresponding to the changes in brightness detected by one or more first pixels of the dynamic vision sensor responsive to the motion of the targeted object.

3. The vision based tracking system of claim 2, wherein the tracking control signal is generated based on locations of the one or more first pixels in the dynamic vision sensor.

4. The vision based tracking system of claim 1 further comprising:
an image sensor configured to capture images including the targeted object.

5. The vision based tracking system of claim 4, wherein generating the tracking control signal further comprises:
performing image processing on the captured image to identify one or more second pixels corresponding to the targeted object in the images; and
generating the tracking control signal based on locations of the one or more second pixels in the images.

6. The vision based tracking system of claim 4, wherein the processor is further configured to:
apply a machine-learned model to the activity events and the captured images to identify the targeted object; and
select the one or more spots on the targeted object to track based on the identification.

7. The vision based tracking system of claim 1, wherein the dynamic vision sensor is configured to detect motion of additional targeted objects.

8. A method comprising:
detecting motion of a targeted object using a dynamic vision sensor;
identifying activity events associated with the motion of the targeted object based on changes in brightness detected by the dynamic vision sensor;
generating a tracking control signal to cause a beam scanner to direct the tracking beam to one or more spots on the targeted object based on the identified activity events;
receiving a portion of the tracking beam reflected from the one or more spots on the target object and light representing the targeted object at a beam splitter;
sending the reflected tracking beam to a photo detector by the beam splitter;
sending the light representing the targeted object to the dynamic vision sensor by the beam splitter; and
determining distances to the one or more spots on the targeted object by detecting the reflected tracking beam.

9. The method of claim 8, wherein the activity events are identified based on one or more pixel events corresponding to the changes in brightness detected by one or more first pixels of the dynamic vision sensor responsive to the motion of the targeted object.

10. The method of claim 9, wherein the tracking control signal is generated based on locations of the one or more first pixels in the dynamic vision sensor.

11. The method of claim 8 further comprising:
capturing images including the targeted object using an image sensor.

12. The method of claim 11, wherein generating the tracking control signal further comprises:

performing image processing on the captured image to identify one or more second pixels corresponding to the targeted object in the images; and generating the tracking control signal based on locations of the one or more second pixels in the images.

13. The method of claim 11, further comprising:

applying a machine-learned model to the activity events and the captured images to identify the targeted object; and selecting the one or more spots on the targeted object to track based on the identification.

14. The method of claim 8 further comprising:

detecting motion of additional targeted objects using the dynamic vision sensor.

15. A non-transitory computer-readable medium storing instructions, that when executed by one or more processors cause the one or more processors to:

detect motion of a targeted object using a dynamic vision sensor;

identify activity events associated with the motion of the targeted object based on changes in brightness detected by the dynamic vision sensor;

generate a tracking control signal to cause a beam scanner to direct the tracking beam to one or more spots on the targeted object based on the identified activity events so that a portion of the tracking beam is reflected from the one or more spots on the targeted object and light representing the targeted object at a beam splitter, the reflected tracking beam sent to a photo detector by the beam splitter and the light representing the targeted object sent to the dynamic vision sensor by the beam splitter; and determine distances to the one or more spots on the targeted object by detecting the reflected tracking beam.

16. The non-transitory computer-readable medium of claim 15, wherein the activity events are identified based on one or more pixel events corresponding to the changes in brightness detected by one or more first pixels of the dynamic vision sensor responsive to the motion of the targeted object.

17. The non-transitory computer-readable medium of claim 16, wherein the tracking control signal is generated based on locations of the one or more first pixels in the dynamic vision sensor.

18. The non-transitory computer-readable medium of claim 15, that when executed by the one or more processors, further cause the one or more processors to:

capture images including the targeted object using an image sensor.

19. The non-transitory computer-readable medium of claim 18, wherein generating the tracking control signal further comprises:

performing image processing on the captured image to identify one or more second pixels corresponding to the targeted object in the images; and generating the tracking control signal based on locations of the one or more second pixels in the images.

20. The non-transitory computer-readable medium of claim 18, that when executed by the one or more processors, further cause the one or more processors to:

apply a machine-learned model to the activity events and the captured images to identify the targeted object; and select the one or more spots on the targeted object to track based on the identification.

* * * * *